US007057907B2

(12) United States Patent
Oh

(10) Patent No.: US 7,057,907 B2
(45) Date of Patent: Jun. 6, 2006

(54) POWER CONVERTER HAVING IMPROVED CONTROL

(75) Inventor: In-Hwan Oh, Cupertino, CA (US)

(73) Assignee: Fairchild Semiconductor Corporation, Sout Portland, ME (US)

( * ) Notice: Subject to any disclaimer, the term of this patent is extended or adjusted under 35 U.S.C. 154(b) by 221 days.

(21) Appl. No.: 10/719,505

(22) Filed: Nov. 21, 2003

(65) Prior Publication Data
US 2005/0111242 A1 May 26, 2005

(51) Int. Cl.
*H02M 3/335* (2006.01)
(52) U.S. Cl. .............................. 363/21.05; 363/21.01; 363/21.07
(58) Field of Classification Search ................. 363/20, 363/21.01, 21.04, 21.05, 21.07, 21.1, 21.13, 363/31.15, 21.18
See application file for complete search history.

(56) References Cited

U.S. PATENT DOCUMENTS

| | | | |
|---|---|---|---|
| 5,272,614 A | 12/1993 | Brunk | |
| 5,313,381 A * | 5/1994 | Balakrishnan | 363/147 |
| 5,325,282 A | 6/1994 | Bansard | |
| 5,349,523 A | 9/1994 | Inou et al. | |
| 5,631,810 A * | 5/1997 | Takano | 363/21.05 |
| 5,633,787 A * | 5/1997 | Song | 363/21.07 |
| 5,932,938 A | 8/1999 | Shimamori | |
| 6,134,123 A * | 10/2000 | Yamada | 363/21.13 |
| 6,169,680 B1 | 1/2001 | Matsui et al. | |
| 6,233,165 B1 * | 5/2001 | Irissou et al. | 363/97 |
| 6,275,018 B1 | 8/2001 | Telefus et al. | |
| 6,304,473 B1 | 10/2001 | Telefus et al. | |
| 6,324,079 B1 | 11/2001 | Collmeyer et al. | |
| 6,396,718 B1 * | 5/2002 | Ng et al. | 363/21.07 |

OTHER PUBLICATIONS

PCT Search Report for International Application No. PCT/US2004/039008.
K.D. Purton, et al., "Average Current Mode Control In Power Electronic Converters—Analog Versus Digital," 5 pages.
Sangsun Kim, et al., "Control of Multiple Single-Phase PFC Modules With a Single Low-Cost DSP," Oct. 2003, vol. 39, No. 5, pp. 1379-1385.
M. Citron, et al., "Susceptibility of Integrated Circuits to RFI: Analysis of PWM Current-Mode Controllers for SMPS," 2002, 5 pages.

* cited by examiner

*Primary Examiner*—Matthew V. Nguyen
(74) *Attorney, Agent, or Firm*—Sidley Austin LLP

(57) ABSTRACT

A power converter using a microcontroller is disclosed herein. In one embodiment, the power converter can be a digital flyback or forward converter. The microcontroller may have a digital pulse-width-modulation (PWM) controller, arithmetic logic unit (ALU) core, internal random access memory (RAM), read-only memory (ROM), and one or more analog-to-digital (A/D) and digital-to-analog (D/A) converters. For a fast dynamic response in an inner current control loop, an analog comparator is used to provide analog-based current control. The analog comparator may compare a signal representative of the current flowing in the power converter against a voltage reference, which can be programmable. The analog comparator may be integrated with the digital microcontroller into single integrated circuit (IC) chip. Furthermore, the power converter can send signals for the status of various conditions (e.g., output voltage levels, current levels, errors, etc.) or can receive signals for system control commands (e.g., output voltage, current protection levels, standby-mode for a lowest power consumption, normal mode, and power ON or OFF commands) via a serial communication port.

19 Claims, 8 Drawing Sheets

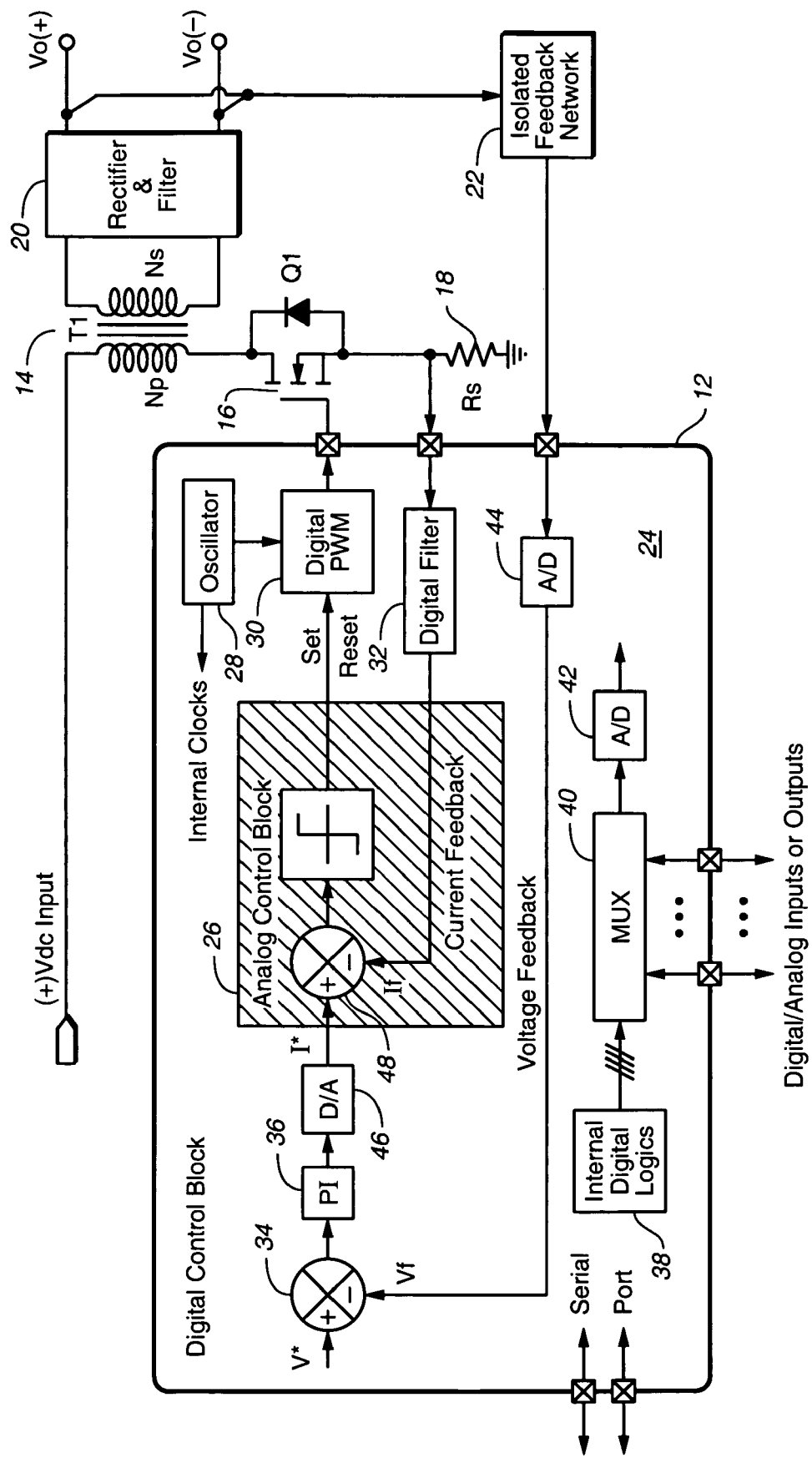
FIG._1

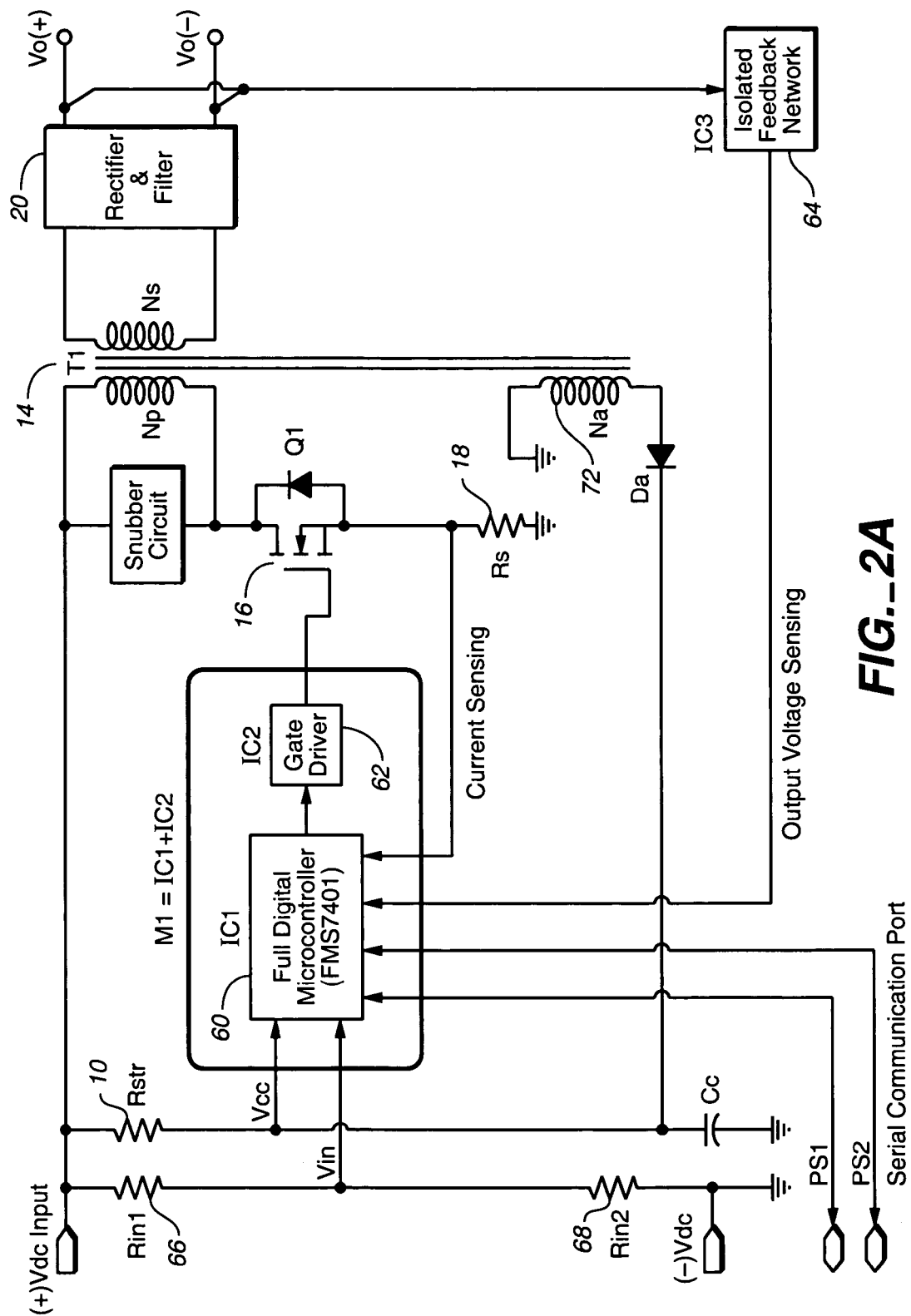
FIG._2A

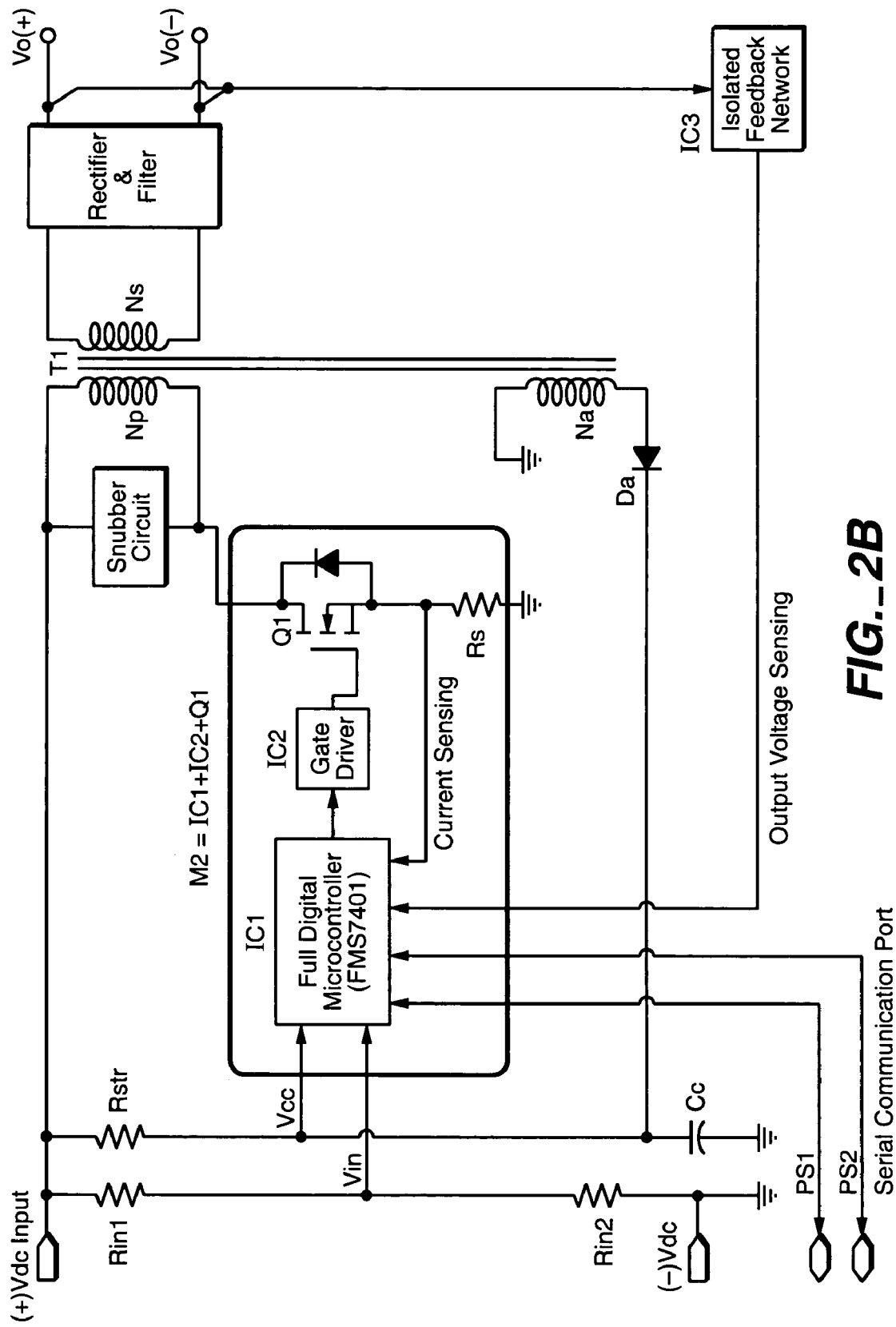
FIG._2B

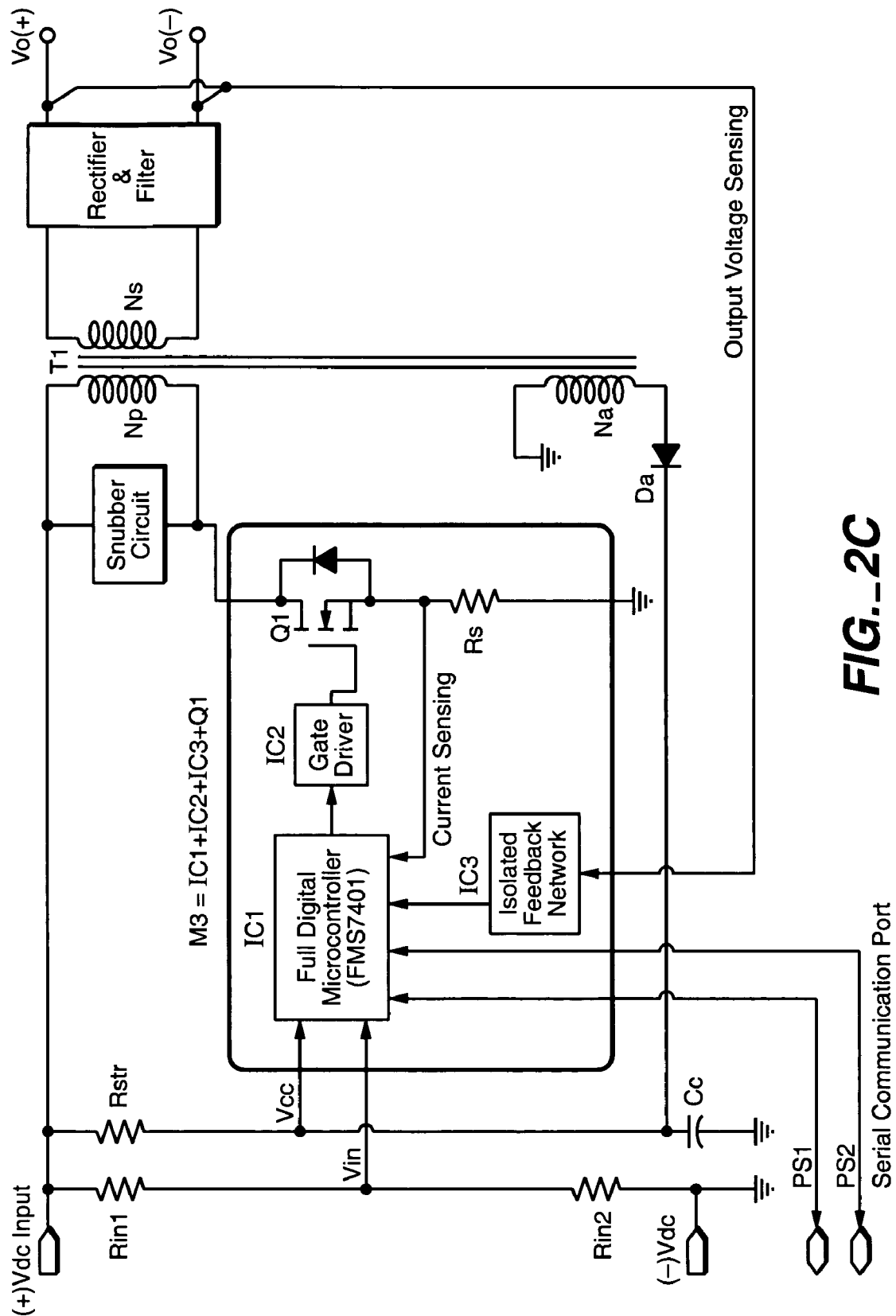
FIG._2C

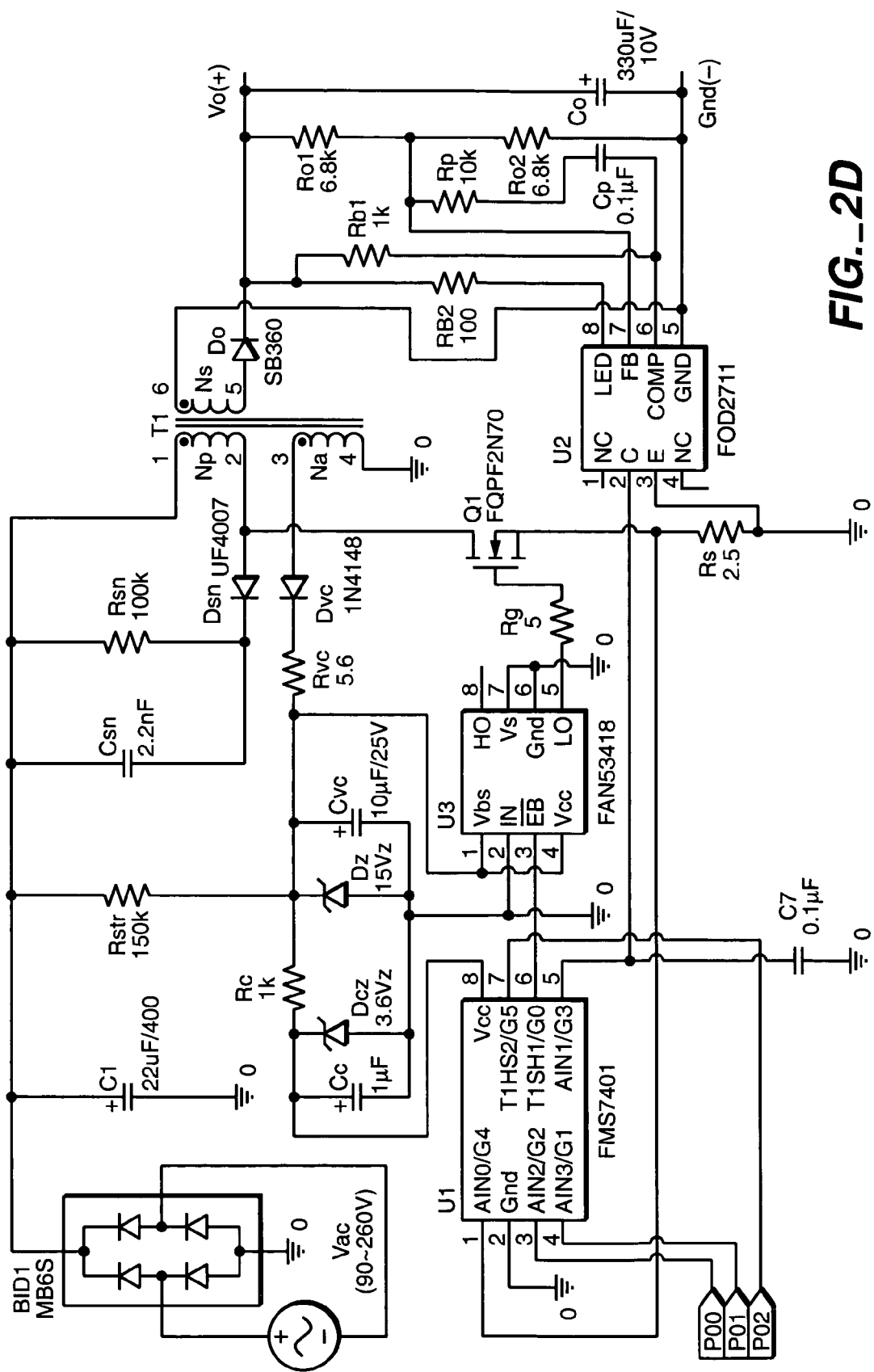
FIG._2D

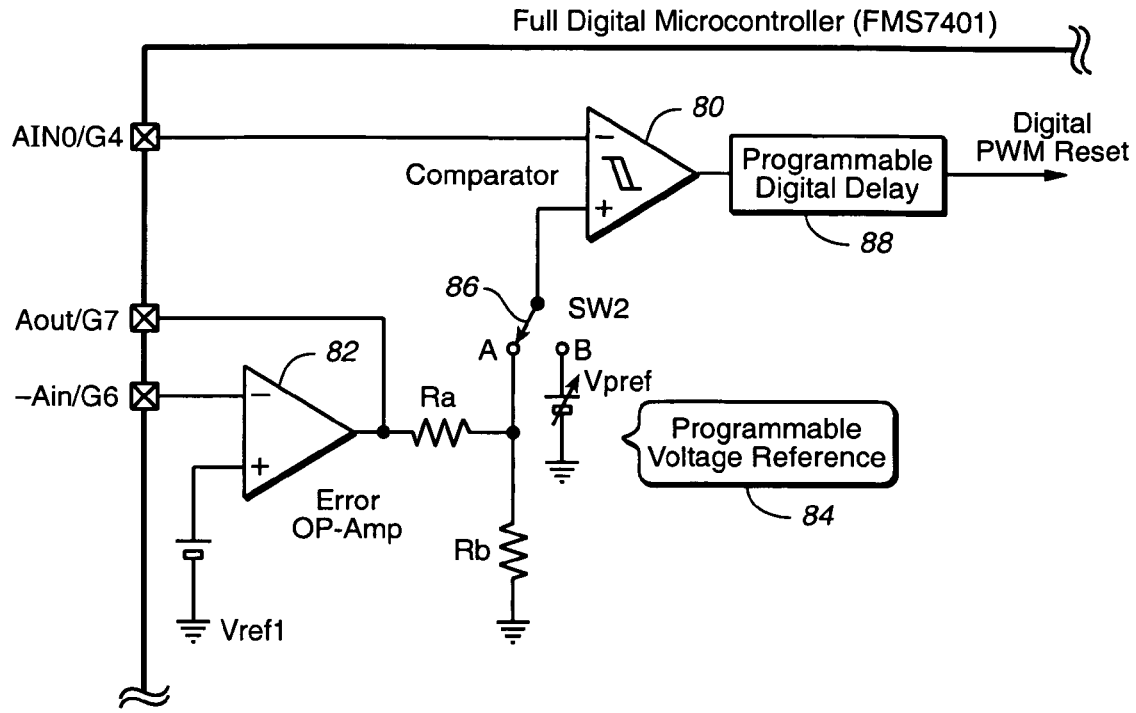
FIG._3
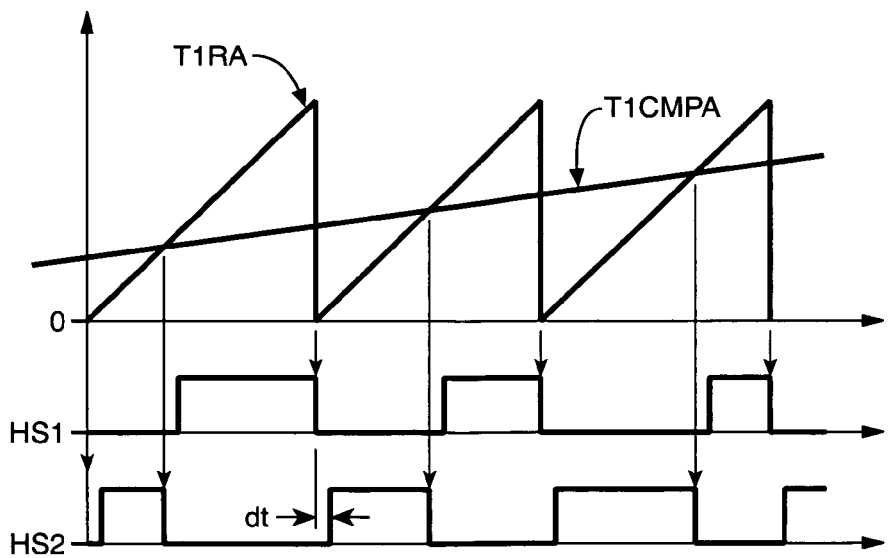
FIG._5

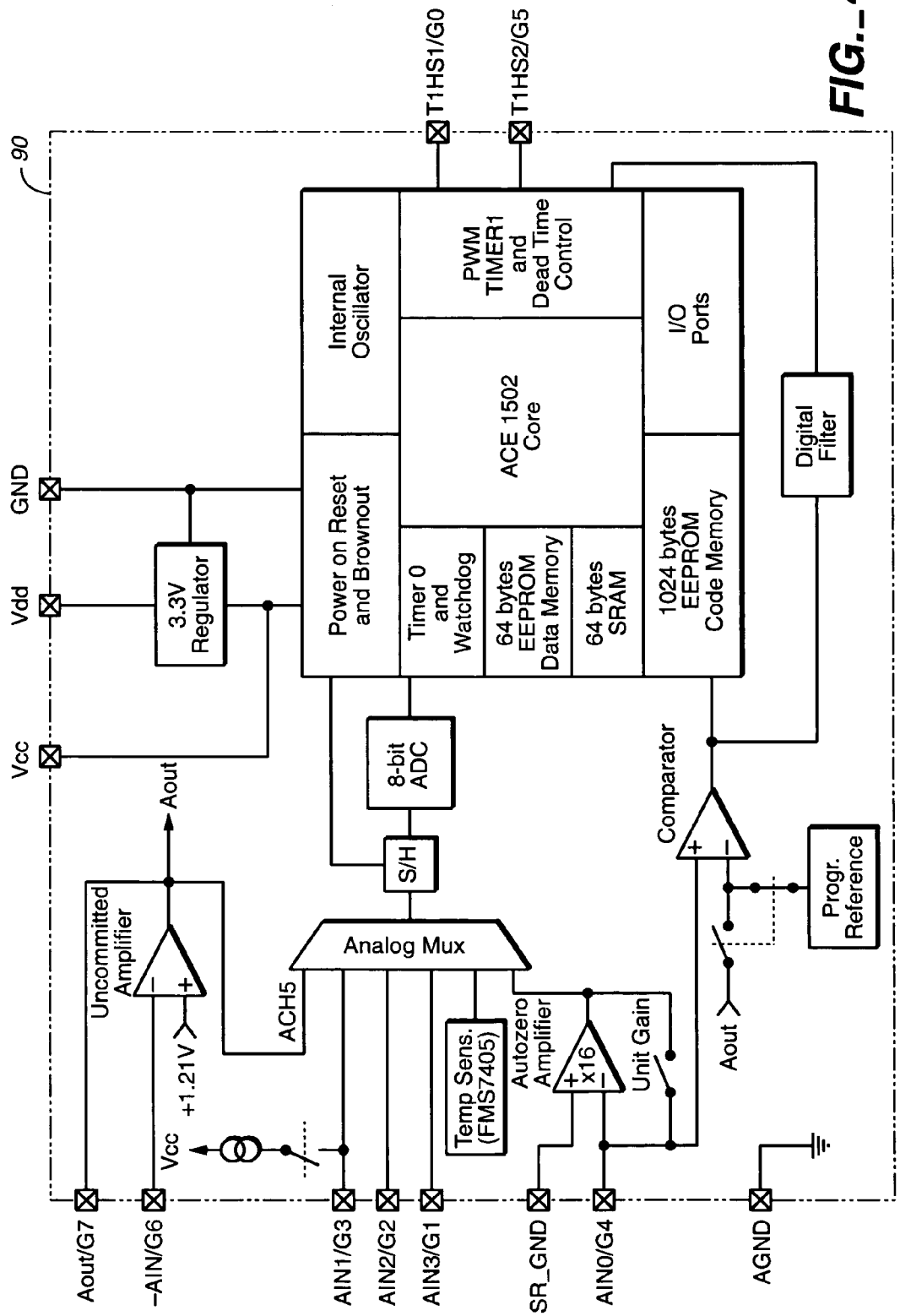
FIG._4

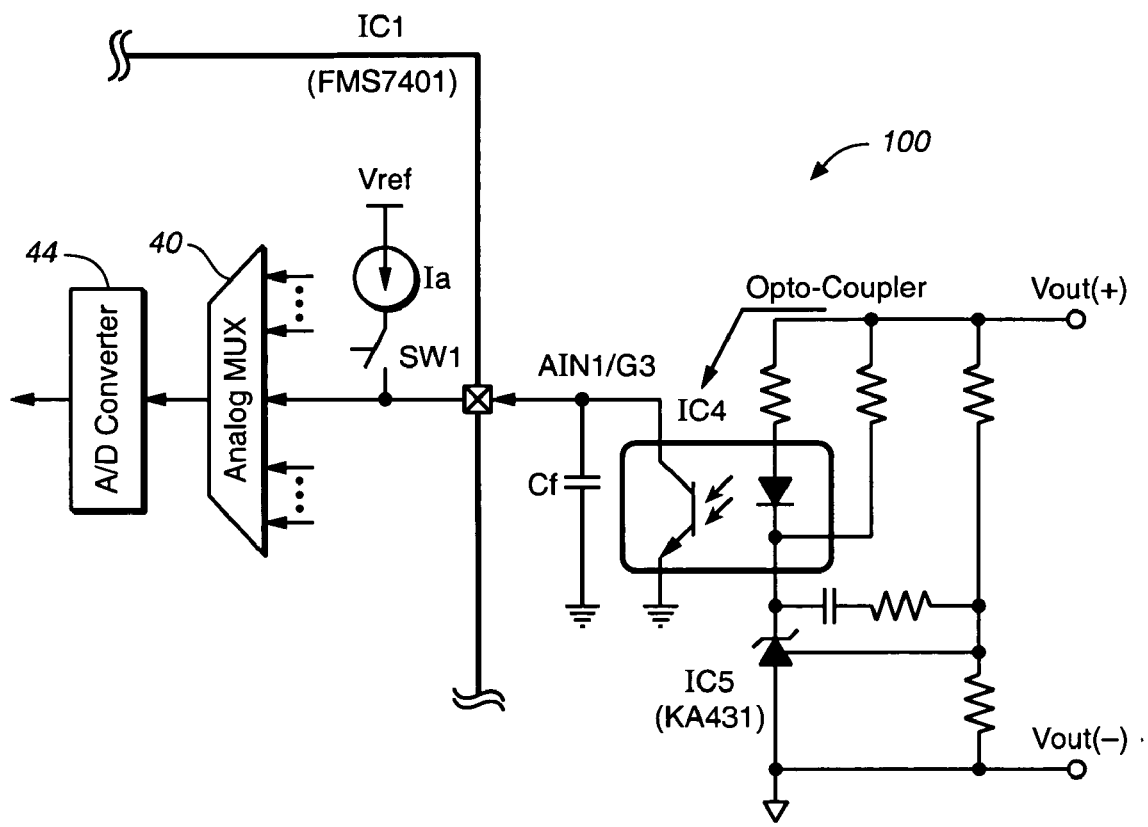
FIG._6
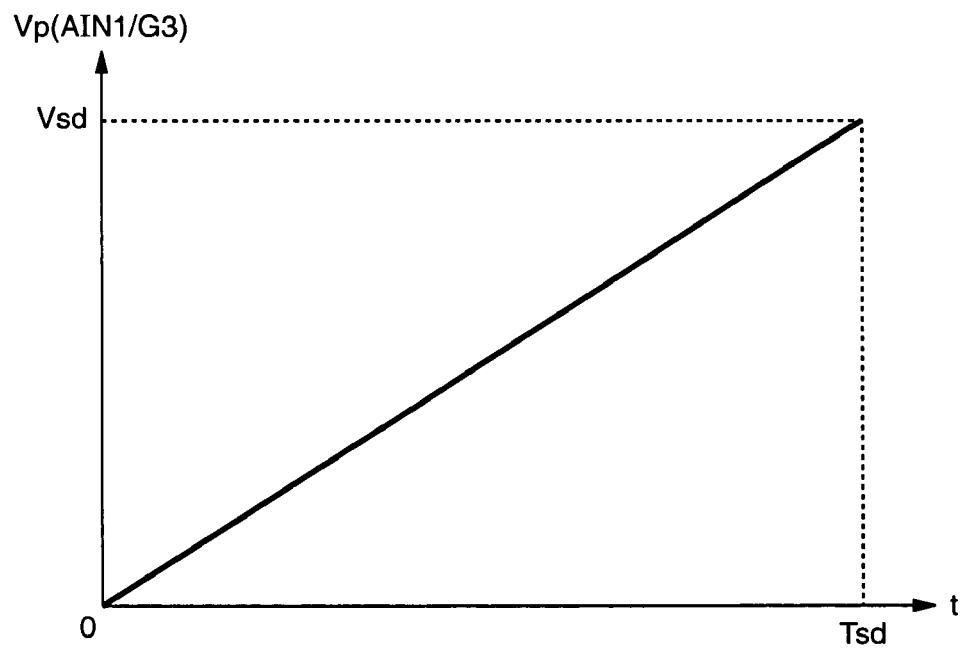
FIG._7

POWER CONVERTER HAVING IMPROVED CONTROL

TECHNICAL FIELD OF THE INVENTION

This invention relates to power conversion, and more particularly, to a power connector having improved control.

BACKGROUND

Power converters are widely used in electrical and electronic devices. Certain devices, such as notebook computer, personal digital assistants (PDAs), cellular telephones, and other portable consumer products, require power converters that provide low standby power consumption in light or no load conditions. To achieve this, the power converters must have some intelligence for monitoring and reacting to various conditions during the power conversion, such as, for example, output voltage, over-voltage and under-voltage, standby or normal mode, power ON and OFF, etc. Furthermore, in some applications, it is desirable to have a very fast calculation time for an internal current controller loop in order to provide good dynamic performance.

Various systems have previously been developed and considered for providing control of power conversion in these kinds of applications. However, all of the various systems have been inadequate or problematic. For example, a purely analog control system, while fast, lacks the necessary intelligence; this results in significant power dissipation under certain conditions (e.g., light or no load). In contrast, a digital control system implemented with a simple microcontroller may have sufficient intelligence, but is too slow. A digital control system implemented with a more complex microprocessor (such as a digital signal processor or DSP) provides sufficient intelligence and very fast calculation speed (e.g., 10–100 μsec) but is not commercially viable for a real market product because it would be too expensive. Furthermore, the hardware in such a control system with complex microprocessor is too complex—i.e., a typical DSP has an 8-bit or 16-bit bus with external read-only memory (ROM), random access memory (RAM), analog-to-digital (A/D) converters, and digital input and output ports.

What is needed is a power converter with a low-cost, intelligent, and fast controller.

SUMMARY

According to an embodiment of the present invention, a power converter includes a transformer having a primary winding and a secondary winding. The primary winding is coupled to receive an input voltage, and the secondary winding provides an output voltage. A transistor, coupled to the primary winding of the transformer, controls the current flowing through the primary winding. A current sensing device, coupled to the transistor, develops a signal indicative of the amount of current flowing through the power converter. The current sensing device forms part of a current control loop for the power converter. A feedback controller, coupled to the second winding of the transformer, provides a signal indicative of an output voltage of the power converter. The feedback controller forms part of a voltage control loop for the power converter. A controller is operable to provide analog control of the current control loop and digital control of the voltage control loop of the power converter.

According to another embodiment of the present invention, a method for providing control in a power converter includes: providing analog control of a current flowing in the power converter for fast, dynamic performance; and providing digital control of the output voltage of the power converter.

According to yet another embodiment of the present invention, power converter includes a transformer having a primary winding and a secondary winding. The primary winding is coupled to receive an input voltage, and the secondary winding provides an output voltage. A transistor is coupled to the primary winding of the transformer for controlling the current flowing through the primary winding. A feedback controller is coupled to the second winding of the transformer for providing a signal indicative of an output voltage of the power converter. A microcontroller is coupled to the transistor for turning on and off the transistor and coupled to the feedback controller for receiving the signal indicative of an output voltage of the power converter. The microcontroller is operable to perform an analog comparison of a signal representative of the current flowing through the primary winding against a reference signal thereby providing fast dynamic response in an inner current control loop of the power converter. The microcontroller is also operable to communicate with external circuitry to receive at least one signal for a control command for the power converter and to send at least one signal indicative of the status of a condition in the power converter.

With some embodiments of the present invention, control functions for a power converter are divided between analog and digital components. To have a very fast dynamic characteristic, an analog controller is used to control the current flow in the power converter. A relatively low-cost digital controller having appropriate calculation speed is used to provide intelligence for processing to control the voltages in the power converter.

In one embodiment, a power converter using a microcontroller is provided. The power converter can be a digital flyback or forward converter. The microcontroller may have a digital pulse-width-modulation (PWM) controller, arithmetic logic unit (ALU) core, internal random access memory (RAM), read-only memory (ROM), and one or more analog-to-digital (A/D) and digital-to-analog (D/A) converters. For a fast dynamic response in an inner current control loop, an analog comparator is used to provide analog-based current control. The analog comparator may compare a signal representative of the current flowing in the power converter against a voltage reference, which can be programmable. The analog comparator may be integrated with the digital microcontroller into single integrated circuit (IC) chip. Furthermore, the power converter can send signals for the status of various conditions (e.g., output voltage levels, current levels, errors, etc.) or can receive signals for system control commands (e.g., output voltage, current protection levels, standby-mode for a lowest power consumption, normal mode, and power ON or OFF commands) via a serial communication port.

Important technical advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which:

FIG. 1 is a block diagram of a power converter having a mixed analog and digital controller, according to an embodiment of the present invention.

FIGS. 2A–2D are schematic diagrams in partial block form for exemplary implementations of the power converter having a mixed analog and digital control, according to embodiments of the present invention.

FIG. 3 is a schematic diagram in partial block form for an exemplary implementation of a portion of mixed analog and digital controller, according to an embodiment of present invention.

FIG. 4 is a schematic diagram in partial block form for an exemplary implementation of a microcontroller used in a mixed analog and digital controller, according to an embodiment of present invention.

FIG. 5 illustrates exemplary waveforms for the digital pulse width modulator, according to an embodiment of the present invention.

FIG. 6 is a schematic diagram in partial block form for an exemplary implementation of an output voltage feedback circuit, according to an embodiment of the present invention.

FIG. 7 illustrates an exemplary waveform for the output voltage feedback level for sensing an over-load condition, according to an embodiment of the present invention.

DETAILED DESCRIPTION

The embodiments of the present invention and their advantages are best understood by referring to FIGS. 1 through 7 of the drawings. Like numerals are used for like and corresponding parts of the various drawings.

FIG. 1 is a block diagram of a power converter 10 having a mixed analog and digital controller 12, according to an embodiment of the present invention. As depicted, power converter 10 includes a transformer 14 having a primary winding Np and a secondary winding Ns, a switch 16 (which can be implemented as a power MOSFET), a sense resistor 18, a rectifier and filter circuit 20, and an isolated feedback controller 22. Power converter 10 receives a voltage Vdc at its input terminal, converts voltage Vdc, and outputs the result as Vo(+) and Vo(−) at the output terminals. A load may be coupled at the output terminals.

Power converter 10 can function or be arranged in a flyback converter or a forward converter topology. In a flyback converter topology, all energy is stored into the transformer 14 when switch 16 is turned on, and the energy is only transferred or released to the load when switch 16 is turned off. In a forward converter topology, there is no storage of energy into the transformer (except a magnetic exciting energy) and a driving energy is immediately transferred to the load when switch 16 is turned on. Whether power converter 10 functions as a flyback converter or a forward converter depends on the direction of the windings Np and Ns of the transformer 14.

In power converter 10, the output voltage responds relatively slowly to changes in the load. In contrast, current flow within power converter 10 changes relatively rapidly when the load changes. A current control loop in power converter 10 may be defined in part by sense resistor 18 on the input side which develops a current that may be input to mixed analog and digital controller 12. The current control loop has fast dynamic characteristics due to the rapid response of the current flow to changes in load condition in power converter 10. A voltage control loop in power converter 10 may be defined in part by isolated feedback controller 22 which senses the output voltage and provides a feedback signal to the mixed analog and digital controller. The voltage control loop is not as fast as the current control loop due to the less responsive characteristics of the output voltage to changes in the load condition. Therefore the fast current control loop is controlled by a analog based circuit and outer voltage control loop is digitally controlled by using digital-based hardware and software. The voltage and current control blocks are mixed together and can be integrated into one semiconductor chip or die.

The operation of power converter 10 is controlled by mixed analog and digital controller 12. As shown in FIG. 1, analog and digital controller 12 includes two control blocks: a digital control block 24 and an analog control block 26. The analog control block 26 can be used in the current control loop in a typical power supply application. The analog control block 26 provides very fast dynamic characteristics in the current control loop, and thus provides fast load regulation. The digital control block 24 can be used in a voltage control loop for supervisory functions requiring intelligence (e.g., voltage and current protection levels, standby-mode for a lowest power consumption or normal mode, and power ON or OFF commands). Because of the apportionment between analog control of the current control loop and digital control of the voltage control loop in power converter 10, the mixed analog and digital controller 12 can be implemented using a relatively simple, low-speed (and thus, low-cost) microcontroller having an appropriate calculation speed. In one embodiment, such microcontroller can be a FMS7401-8 or FMS7401-14 part available from Fairchild Semiconductor Corporation. The microcontroller may have a digital pulse-width-modulation (PWM) controller, arithmetic logic unit (ALU) core, internal random access memory (RAM), read-only memory (ROM), and one or more analog-to-digital (A/D) and digital-to-analog (D/A) converters. The microcontroller can be programmable.

Mixed analog and digital controller 12 controls power converter 10 by turning on and off switch or transistor 16, in response to various current and voltage conditions in the power converter 10. Controller 12 can control the switching frequency of switch 16. Typically, a higher switching frequency is desirable for reducing the apparent component sizes under rated load conditions. But switching loss is proportional to the switching frequency. At higher switching frequency, the standby power consumption in no load or light load condition is large. Mixed analog and digital controller 12 reduces or minimizes switching losses by decreasing the switching frequency to an appropriate level in such light or no-load condition. Furthermore, in some embodiments, the driving frequency can be dynamically adjusted.

In one embodiment, the mixed analog and digital controller 12 may have the ability to communicate with external circuitry (e.g., a host or main processor). This allows the controller 12 to send various information about status conditions (e.g., temperature), error conditions, etc. to external devices for controlling the same. For example, an analog temperature sensing signal can be sent out from mixed analog and digital controller 12 and used for controlling the cooling level of an electronic device (e.g., laptop computer) in which the power converter 10 is incorporated depending on the current operating temperature. Also, the mixed analog and digital controller 12 can receive various information, such as signals for controlling, configuring, or adjusting the operation of the power converter 10. For example, an analog output voltage feedback command signal can be sent to mixed analog and digital controller 12. Communication with power converter 10 can be achieved with a serial port (e.g., RS-232), A/D input port, or any other suitable input/output port (e.g., I2C port).

Digital control block 24 may include an oscillator 28, a digital pulse width modulator (PWM) 30, a digital filter 32, a comparator 34, a digital proportional and integrator (PI) 36, internal digital logic 38, a multiplexer (MUX) 40, and various analog-to-digital (A/D) converters 42, 44 and digital-to-analog (D/A) converters 46. Oscillator 28 generates one or more clock signals, which can be output to internal clocks for the digital control block 24 and to digital pulse width modulator (PWM) 30. Digital pulse width modulator (PWM) 30 provides the signal for turning on and off switch 16, as described herein in more detail. Digital pulse width modulator (PWM) 30 may output a signal at a fixed frequency, or alternatively, the frequency may be variable. Digital filter 32 receives and filters a current feedback signal developed across the sense resistor 18. Internal digital logic 38 may store and process commands for controlling power converter 10. MUX 40 functions to multiplex signals into and out of mixed analog and digital controller 12. Comparator 34, which can be implemented with internal software, compares an voltage command (V*) signal against a voltage feedback signal. The V* signal represents a desired output voltage level and can be an internal digital reference value (generated, for example, by internal digital logic 38) or an external command received through a suitable port. The voltage feedback signal represents the actual output voltage level of power converter 10. The voltage feedback signal can in digital format and derived from a signal received from the isolated feedback controller 22. Digital proportional and integrator (PI) 36, which can be implemented in software, receives the difference between the V* signal and the voltage feedback signal. Digital proportional and integrator (PI) 36 mathematically calculates an error value to generate a current command (I*) signal. This current command (I*) signal can be used in analog or digital form. As depicted in FIG. 1, the current command (I*) signal is converted into analog signal by internal D/A converter 46. This analog current command (I*) signal is sent to analog comparator control block 26.

Analog control block 26 comprises an analog based comparator 48. Analog based comparator 48 compares the current command (I*) signal with an analog current feedback signal generated by digital filter 32 from the current developed by sense resistor 18. Depending on the result of this comparison, the operation of digital pulse width modulator (PWM) 30 is controlled so that the time for turning on and off switch 16 is properly adjusted. In one embodiment, if digital pulse width modulator (PWM) 30 operates with a fixed frequency, then the output control signal from analog control block 26 functions to cause digital pulse width modulator (PWM) 30 to apply the fixed frequency signal to switch 16 or not. Alternatively, if the frequency of digital pulse width modulator (PWM) 30 can be varied, then the output control signal from analog control block 26 may function to also adjust the frequency.

In FIG. 1, the mixed analog and digital controller 12 is depicted somewhat conceptually. Actual hardware implementation for the mixed analog and digital controller 12 may not correspond exactly to the components shown in FIG. 1.

In one embodiment, the power converter 10 can be configurable. In particular, various parameters for mixed analog and digital controller 12 can be adjusted, modified, or otherwise configured to control the operation of power converter 10. This is advantageous in that a single hardware architecture for power converter 10 can be used for multiple and varied applications. Thus, power converter 10 is very versatile.

FIGS. 2A–2D are schematic diagrams in partial block form for exemplary implementations of the power converter 10 having a mixed analog and digital control, according to embodiments of the present invention.

In the embodiment of FIG. 2A, mixed analog and digital controller 12 can be implemented with multiple integrated circuit (IC) die. These include IC1 60, IC2 62, and IC3 64. The IC1 60 can be an analog mixed digital microcontroller, such as a FMS7401-8 or FMS7401-14 product available from Fairchild Semiconductor Corporation, which implements a pulse width modulation (PWM) controller. IC2 62 can be a MOSFET gate driver, such as a FAN53418 product also available from Fairchild Semiconductor Corporation. As depicted, in this embodiment, IC1 60 and IC2 62 can be placed in the same package. IC3 64 implements the isolated feedback controller 22 and can be a FOD2711 available from Fairchild Semiconductor Corporation.

Referring again to FIG. 2A, input resistors 66 and 68 are for sensing the voltage level of input supply voltage Vdc. This detected input voltage level can be used as an input for providing under-voltage or over-voltage protection. The detected input voltage level can also be used as feed-forward input for fast regulation of the output voltage. A resistor 70 is a start-up resistor for supplying an operating power to IC1 60 and IC2 62 when input power is initially applied (because the transformer 14 is not excited at that time). A voltage obtained through an auxiliary winding Na 72 may be used to supply the operating voltages to IC1 60 and IC2 62. The resistor 18 is a current sensing resistor to sense the current flowing through primary winding Np of transformer 14. In some embodiments, IC3 64 can include a voltage reference along with an optocoupler. The voltage reference and optocoupler can each be implemented on a respective IC, such as IC4 and IC5 as shown in FIG. 6. Serial communication ports PS1 and PS2 may be provided for receiving signals indicating the status of the power supply and various control commands such as ON or OFF and for changing between standby and normal mode, output voltage, and changing various protection levels if needed.

The embodiments of FIGS. 2B and 2C are substantially similar to the embodiment of FIG. 2A with a notable difference being that, in the embodiments of FIGS. 2B and 2C, additional components may be packaged along with IC1 60 and IC2 62. In particular, in the embodiment of FIG. 2B switch 16 and resistor 18 are co-packaged with IC1 60 and IC2 62, and in the embodiment of FIG. 2C IC3 64 is also added.

FIG. 2D illustrates an exemplary implementation for a power converter 10, with IC1 60, IC2 62, and IC3 64 represented with the pinout configurations of particular products that can be used.

As described herein, with some embodiments of the present invention, control functions for a power converter are divided between analog and digital components. An analog controller is used to provide very fast dynamic characteristic in the current control loop. This allows a relatively low-cost, digital microcontroller having appropriate calculating speed (which does not need to be especially fast) to be used for processing the voltage control loop. In other embodiments, also described herein, control functions for both the current control loop and the voltage control loop are implemented in analog form, and the relatively low-cost, digital microcontroller is used for primarily supervisory functions in the power converter (e.g., monitoring input and output status of the power system, and turning the system on or off in response thereto). The speed required for such supervisory functions may be relatively slow compared with closed control speed. In this case, the microcontroller does not intervene in the control loop; instead it supervises the overall operation of power converter 10 by sensing input and output voltage and current, thus, providing protective features for power converter 10. Also, the microcontroller may send out signals indicating the current status of various operating conditions and may receive various commands from external circuitry.

FIG. 3 is a schematic diagram in partial block form for an exemplary implementation for a portion of mixed analog and digital controller 12, according to an embodiment of present invention. As shown, controller 12 may include a comparator 80 and an operational amplifier (OP-Amp) 82. In addition, there is a programmable voltage reference (Vpref) 84, a switch 86, and a programmable digital delay element 88.

Operational amplifier 82 may be part of the voltage control loop. As such, operational amplifier 82 may receive a voltage feedback signal which is representative of the output voltage of power converter 10. This signal can be in analog form, as provided in this embodiment, or in digital form, as provided in the embodiment depicted in FIG. 1. In one embodiment, operational amplifier 82 can be used to implement the comparator 34 and proportional integrator (PI) controller 36 shown in FIG. 1. Operational amplifier 82 outputs a current command (I*) signal that is an analog signal based on an analog voltage control method.

Programmable voltage reference (Vpref) 84 provides an alternative current command (I*) signal. The value of programmable voltage reference (Vpref) 84 may be programmed with software or information stored in a register of the internal digital logic of the mixed analog and digital controller 12.

Switch 86, which can be an analog switch, can be switched between a position A and a position B. In one embodiment, the position of switch 86 can be controlled by setting a register in the controller. Depending on the position of switch 86, the microcontroller may use either the output from operational amplifier 82 or the programmable voltage reference (Vpref) 84 as the current command (I*) signal.

Comparator 80, which may be part of the current control loop, receives the sensed current signal (generated by current sense resistor 18) at one of its input terminal. At the other input terminal, comparator 80 receives the current command (I*) signal, which can be either the operational amplifier 82 output or the programmable voltage reference (Vpref) 84 depending on the position of switch 86. If position A is selected (as shown in FIG. 3), the output from operational amplifier 82 is used. If position B is selected for switch 86, then the operational amplifier 82 is disconnected with internal digital core and the programmable voltage reference (Vpref) is used.

Comparator 80 generates a signal (digital PWM reset) for controlling the load current by comparing the actual load current against the current command (I*) signal. In one embodiment, if the sensed load current is larger than the current command (I*) signal, the output of comparator 80 becomes low. After a delay provided by programmable digital delay element 88, the comparator output is provided to the digital pulse width modulator (PWM) 30 (FIG. 1) which turns off switch or transistor 16. As such, current in the primary winding Np of transformer 14 is reduced. This, in turn, causes the load current flowing in secondary winding Ns of transformer 14 to decrease. Otherwise, if the actual load current is less than the current command (I*) signal, then the output of comparator 80 becomes high. This causes the digital pulse width modulator (PWM) 30 to turn or maintain the transistor 16 on until the load current flowing in the secondary winding of transformer 14 rises to the level of the current command (I*) signal. Thus, changes in load current (detected by sense resistor 18) cause rapid changes to the control for digital pulse width modulator (PWM) 30. As such, the current control loop can be quickly processed using analog circuitry without significant delay time or any intervention of the microcontroller.

FIG. 4 is a schematic diagram in partial block form for an exemplary implementation of a microcontroller 90 used in a mixed analog and digital controller, according to an embodiment of present invention. Microcontroller 90 can be programmable and may operate at speeds suitable for control of voltage control loop, such as, for example, 1–10 ms sampling time or calculation time in the voltage control loop. As depicted, the microcontroller 90 may include, among other elements, one or more comparators, analog-to-digital converter (ADC) with sample-and-hold, digital filter for filtering the signal from current sensing network, internal current source, internal voltage regulator, timers, electrically erasable programmable read only memory (EEPROM) for data and software code, internal RAM, internal oscillator, pulse width modulation (PWM) timer, and processing core (e.g., ACE digital core logic). The microcontroller may have an 8-bit bus structure.

FIG. 5 illustrates exemplary waveforms for the digital pulse width modulator (PWM) 30, according to an embodiment of the present invention. In some embodiments, the digital pulse width modulator (PWM) 30 can be implemented in the digital microcontroller (e.g., IC1 60) and the gate driver (e.g., IC2 62) for mixed analog and digital controller 12.

Referring to FIG. 5, the digital pulse width modulator (PWM) 30 may output signals HS1 and HS2, one or both of which can be used, for example, as a set/reset signal to control the transistor or switch 16. The output signals HS1 and HS2 can be in digital or analog format. In one embodiment, the output signals HS1 ad HS2 can be used to drive external power devices.

As depicted, the output signals HS1 and HS2 are derived or generated from an incremental counter signal T1RA and a comparison signal T1CMPA. The incremental counter signal T1RA may be output by an automatic incremental counter of the mixed analog and digital controller 12. The value of the incremental counter signal T1RA is increased by an internal pulse width modulation (PWM) clock. The frequency can be also adjusted by writing into a register of the internal digital logic 38. The comparison signal T1CMPA may be output from a comparator of the digital control block 12 and its value can also be stored in a register. The value of the counter signal T1RA is compared against the value of the comparison signal T1CMPA. As long as the value of the comparison signal T1CMPA is greater than the value of the counter signal T1RA, the output signal HS1 is low ("0"). If the value of counter signal T1RA exceeds that of comparison signal T1CMPA, the output signal HS1 becomes high ("1") after a short delay time (dt). This delay time (dt), which can be programmed in one embodiment, provides a dead time in order to reduce a cross current flowing from both signals HS1 and HS2, which can be gate signals of high and low side power devices. This can be important for high-and-low-side converter topologies, such as push-pull, half-bridge, and full-bridge. Output signal HS2 becomes high when the incremental counter signal T1RA resets and stays high until the incremental counter signal T1RA exceeds the comparison signal T1CMPA. Also, the HS1 and HS2 signal levels can be an inversion by setting an internal control register.

It can be seen from FIG. 5 that if the maximum value of incremental counter signal T1RA is set relatively small, then the switching frequency for the power converter 10 is increased. Otherwise, if the maximum value of counter signal T1RA is set at a relatively large value, then the switching frequency is decreased. Thus, the digital PWM 30 can change the switching frequency adaptively depending on load condition for power converter 10.

FIG. 6 is a schematic diagram in partial block form for an exemplary implementation of an output voltage feedback circuit 100, according to an embodiment of the present invention. The output voltage feedback circuit 100 may be electrically isolated between the input and output sides of power converter 10. Some portion of output voltage feedback circuit 100 may be implemented in an integrated circuit (IC) die for the microcontroller, and portions of the feedback circuit 100 may be implemented in additional ICs for an opto-coupler and a Schottky diode (i.e., IC4 and IC5, respectively). In some embodiments, output voltage feedback circuit 100 may implement at least a portion of a feedback controller 22. Voltage feedback circuit 100 uses an internal current source (Ia). FIG. 7 illustrates an exemplary waveform for the output voltage feedback level for sensing an overload condition, according to an embodiment of the present invention.

If there is an increase in load current for power converter 10, then the output voltage decreases slightly. Therefore, in output voltage feedback circuit 100, the anode current of a light-emitting diode (LED) of the opto-coupler also decreases. Hence, the collector current of the opto-coupler decreases and the voltage level at node (AIN1/G3) will increase because the internal current source (Ia) charges the parallel capacitor (Cf) according to the following equation:

$$V_p(AIN1/G3) = \frac{1}{C_f}\int i(t)dt = \frac{I_a}{C_f}t$$

If appropriate current is being supplied to the load, then output voltage is set at a proper level. Otherwise, if too much current is being supplied to the load (overcurrent or overload condition) and the output voltage is lower than the rated level for power converter 10, then the voltage level at node (AIN1/G3) will increase as shown in FIG. 7. The microcontroller monitors this voltage level and can recognize the overload condition if the voltage level exceeds the predefined overload voltage level (Vsd). Hence, various intelligent protections can be provided by using the mixed analog and digital controller.

By monitoring the voltage level at pin (AIN1/G3) as shown in FIG. 7, the power supply can be protected from overload condition. Also monitoring the input voltage level by using Rin1 and Rin2 as shown in FIGS. 2A, 2B, and 2C, the input overvoltage and undervoltage condition can be recognized. The overcurrent protection feature can also be obtained by comparing the amplitude of current sensing signal at pin (AIN0/G4) as shown in FIGS. 2D and 3. If there is short or very high current sensed, then power transistor 16 (e.g., MOSFET) is immediately turned off with little or no delay time. This is cycle-by-cycle current protection feature.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

The invention claimed is:

1. A power converter comprising:
    a transformer having a primary winding and a secondary winding, the primary winding coupled to receive an input voltage, and the secondary winding for providing an output voltage;
    a transistor coupled to the primary winding of the transformer for controlling the current flowing through the primary winding;
    a current sensing device coupled to the transistor for developing a signal indicative of the amount of current flowing through the power converter, the current sensing device forming part of a current control loop for the power converter;
    a feedback controller coupled to the second winding of the transformer for providing a signal indicative of an output voltage of the power converter, the feedback controller forming part of a voltage control loop for the power converter; and
    a controller operable to provide analog control of the current control loop and digital control of the voltage control loop of the power converter.

2. The power converter of claim 1 wherein the controller comprises a comparator for comparing a signal representative of the current flowing through the primary winding against a reference signal, thereby providing fast dynamic response in the current control loop of the power converter.

3. The power converter of claim 2 wherein the reference signal is programmable.

4. The power converter of claim 1 wherein the controller comprises a relatively slow, low-cost digital microcontroller.

5. The power converter of claim 1 wherein the controller comprises a digital pulse-width-modulation (PWM) controller operable to apply a signal to a gate of the transistor for turning on and off the transistor.

6. The power converter of claim 1 wherein the controller comprises:
    a comparator for comparing a signal representative of the current flowing through the primary winding against a reference signal thereby providing fast dynamic response in the current control loop of the power converter; and
    digital pulse-width-modulation (PWM) controller operable to apply a signal to a gate of the transistor for turning on and off the transistor.

7. The power converter of claim 6 wherein the comparator and the digital pulse-width-modulation (PWM) controller are implemented on a single integrated circuit (IC) chip.

8. The power converter of claim 1 wherein the current sensing device comprises a resistor.

9. The power converter of claim 1 wherein the controller is operable to communicate with external circuitry to receive at least one signal for a control command for the power converter and to send at least one signal indicative of the status of a condition in the power converter.

10. The power converter of claim 1 wherein the controller comprises a port for communicating with external circuitry.

11. A power converter comprising:
- a transformer having a primary winding and a secondary winding, the primary winding coupled to receive an input voltage, and the secondary winding for providing an output voltage;
- a transistor coupled to the primary winding of the transformer for controlling the current flowing through the primary winding;
- a feedback controller coupled to the second winding of the transformer for providing a signal indicative of an output voltage of the power converter; and
- a microcontroller coupled to the transistor for turning on and off the transistor and coupled to the feedback controller for receiving the signal indicative of an output voltage of the power converter, wherein the microcontroller is operable to perform an analog comparison of a signal representative of the current flowing through the primary winding against a reference signal thereby providing fast dynamic response in an inner current control loop of the power converter, and wherein the microcontroller is operable to communicate with external circuitry to receive at least one signal for a control command for the power converter and to send at least one signal indicative of the status of a condition in the power converter.

12. The power converter of claim 11 wherein the microcontroller operates at relatively slow speed.

13. The power converter of claim 11 wherein the microcontroller comprises a digital pulse-width-modulation (PWM) controller.

14. The power converter of claim 11 wherein the microcontroller comprises random access memory (RAM) and read-only memory (ROM).

15. The power converter of claim 11 wherein control command may comprise a command for one of output voltage, current protection, standby-mode, normal mode, power ON, and power OFF.

16. The power converter of claim 11 wherein condition may comprise one of input voltage level, output voltage level, current level, and error.

17. The power converter of claim 11 wherein a level of the reference signal is programmable.

18. The power converter of claim 11 wherein the microcontroller is implemented in a single integrated circuit (IC) chip.

19. The power converter of claim 11 wherein the microcontroller comprises a serial communication port for the receiving and sending of signals.

* * * * *